United States Patent [19]

Heston et al.

[11] Patent Number: 4,935,888
[45] Date of Patent: Jun. 19, 1990

[54] COMPUTER KEYBOARD TEMPLATE SYSTEM

[75] Inventors: Marvin D. Heston, Seattle; Robert T. Stewart, Woodenville, both of Wash.

[73] Assignee: Wink Data Products Corporation, Lynnwood, Wash.

[21] Appl. No.: 191,431

[22] Filed: May 9, 1988

[51] Int. Cl.<sup>5</sup> ............................................. G06F 1/00
[52] U.S. Cl. .............................. 364/708; 235/145 R
[58] Field of Search ..................... 364/708, 709.1; 434/118, 227; 235/145 R, 146; 341/23

[56] References Cited

U.S. PATENT DOCUMENTS

| | | | |
|---|---|---|---|
| 3,560,964 | 2/1971 | Bedell et al. | 341/23 |
| 4,066,850 | 1/1978 | Heys, Jr. | 235/145 R |
| 4,119,839 | 10/1978 | Beckmann et al. | 235/145 R |
| 4,634,970 | 1/1987 | Payne et al. | 340/720 X |
| 4,680,455 | 7/1987 | Kuo | 235/146 |

FOREIGN PATENT DOCUMENTS

| | | | |
|---|---|---|---|
| 60-17523 | 1/1985 | Japan | 341/23 |
| 61-174860 | 8/1986 | Japan | 341/23 |

OTHER PUBLICATIONS

Cummings, "*Variable keyboard for Terminal Displays*", IBM Tech. Disclosure Bull., vol. 16, No. 2, Jul. 1973, pp. 575–576.

Langdon et al., "*Selectable Keyboard Templates with Attachable Template Container*", vol. 24, No. 10, 3/1982, pp. 4905–4906.

*Primary Examiner*—Gary V. Harkcom
*Assistant Examiner*—Tan V. Mai
*Attorney, Agent, or Firm*—Robert J. Schaap

[57] ABSTRACT

A computer keyboard template system which utilizes a tray device capable of being disposed in juxtaposition to the keyboard keys of a computer input terminal. The tray device is comprised of a base section capable of being disposed on the input terminal housing and a tray which is adjustably positionable with respect to the base. The tray is designed to receive a number of keyboard templates such that any one keyboard template may be selected and located in the forwardmost position on the stack of templates within the tray and in a position to be adjacent to the function keys of the computer input terminal. Thus, and in a preferred embodiment, the selected template is located adjacent to a row of keys, such as the upper row of function keys, on the keyboard of the computer. In this way, the user of the system will be able to quickly and easily select the proper keys for selected operations in accordance with the instructions on the template.

24 Claims, 7 Drawing Sheets

COMPUTER KEYBOARD TEMPLATE SYSTEM

BACKGROUND OF THE INVENTION

1. Field of the Invention

This invention relates in general to certain new and useful improvements in computer keyboard template systems and more particularly, to computer keyboard template systems in which a plurality of templates in a tray may be arranged such that any one particular template associated with a selected program in the computer can be disposed in a position where it is readily viewable by an operator.

2. Brief Description of the Prior Art

Generally, most computer programs have certain common features such that certain of the specific keyboard keys on the computer are assigned to activate specific program functions. Each program may use the function keys or the other keys on the keyboard in a different manner, but in each case, certain keys, when actuated, or certain predetermined combinations of keys, when actuated, will enable the performance of the particular function. Accordingly, the operator of the computer must have knowledge of the assigned key functions in order to make use of the program.

As a specific example, in one word process program, certain of the function keys may each have an assigned function such as deleting material, inserting material, scrolling of a page of the document or the like. Another word process program may have the same functions, but with different function keys assigned to perform these functions or otherwise combination of keys assigned to perform these functions.

Most computer programs are accompanied by software manuals which explain the key assignments for use with the particular program. However, in this case, the user is either expected to know the particular key assignments or otherwise is required to examine the manuals on each occasion when a particular function is to be performed.

In recent years, and particularly with the advent of the so-called "hard disk" many computer users will have a number of programs introduced into the memory, particularly the random access memory, of that computer. One of these programs, for example, may be a spread sheet program, another may be an accounting package, another may be a word process program, another may be a scientific illustration package, etc. However, in order to use each of these different programs, the user must be either familiar with or constantly resort to the software manuals accompanying each of these programs. Some of these programs may literally have hundreds of key combinations corresponding to the keys on the computer keyboard. In this case, the user of these programs must either commit to his or her own memory a large volume of assigned key functions or examine the manuals each time that a given function is to be performed.

Many computer programs are also provided with templates which are arranged to lie on the top of or adjacent to the keyboard of the computer. These templates typically have printed key assignment information on the upper surfaces thereof to enable a user to readily locate a proper key in order to perform a desired function. However, due to the limited space available on most templates, the information which is contained on the template is brief and still requires that the user consult the software manual on a regular basis in order to properly use a particular program.

Inasmuch a the use of the presently available keyboard template and the user manuals for each program can be time consuming and materially increases the time for using a program, certain companies have started producing larger templates which could also fit onto a keyboard and display much more information. Even these large display keyboard templates still use an accompanying manual or otherwise a quick reference book. These quick reference books, which do not contain a specific keyboard layout, are readily available for a large number of computer programs. While these quick reference books are capable of supplying the user with the desired information for use of a program, there are several drawbacks to these reference books. Some of the problems associated with the quick reference books is the fact that in many cases, insufficient information is provided. Moreover, due to the brief size of the reference books, many functions which could be performed with a particular program are not identified in the quick reference books. Thus, these reference books possess a number of serious disadvantages.

One of the principle problems with providing programs for a computer along with an associated template and a reference manual is the fact that computer keyboards will differ from brand to brand of computer. Moreover, even for the same brand of computer, the keyboards may change periodically, as for example, from year to year. Using current designs, a differently shaped template is required for each new keyboard design. Thus, the template supplier must provide a specific template and a specific reference manual for each individual type of keyboard which is available and also for the various differing keyboards offered by several computer manufacturers.

In view of the above, it can be observed that the number of templates which are required for use in a computer is a product of the number of available keyboards multiplied by the number of programs to be supported on a particular computer. The total is already in substantial excess of the number of programs and the associated templates and reference manuals any retailer can keep in stock. The user must buy a separate template for each program which is purchased, as aforesaid. Inasmuch as only one template can be used at any point and time, the user must find a place to store the templates which are not being used. Typically, most computer templates which are made from fragile materials, such as paperboard materials or very thin plastic sheet material, are not easily and safely stored in most computer work areas. Moreover, due to the multiplicity of designs required, only the most popular software combinations have templates available.

The users of many of the standard keyboard programs have no templates or program manuals to satisfy their needs. Heretofore, there has not been any effective system for both storing computer keyboard templates and selecting a particular template for operation of a particular selected program and then locating that template with reference to a computer keyboard. More specifically, there is no system which utilizes a tray capable of having keyboard templates located in an adjacent position to the keys of a keyboard.

U.S. Pat. No. 4,466,798 to Conroy discloses a training device using a layout of a computer keyboard on a first sheet with a second sheet hingedly attached to the first sheet. The second sheet contains a layout of the screen and the information which would be presented thereon. Moreover, the system also includes a third sheet hingedly connected to the first sheet and this third sheet contains instructions for use of the computer keyboard for a selected program. However, the Conroy patent does not disclose the concept of using a tray containing the plurality of individual keyboard layouts which could be disposed in juxtaposition to a computer keyboard.

U.S. Pat. No. 4,652,014 to Maher discloses an information retrieval apparatus. Various hingedly mounted sheets of material are used. These sheets of material contain information which provides rapid access to information relating to the probable cause of an apparent or actual fault or other machine malfunction. These sheets also contain a recommended action to correct such malfunction. However, the system in the Maher patent is not designed for use in conjunction with a computer keyboard as such.

U.S. Pat. No. 3,971,140 to Martinez, U.S. Pat. No. 1,370,737 to Furrey, U.S. Pat. No. 368,962 to Munroe et al., and U.S. Pat. No. 1,078,537 to Corcoran all disclose various types of trays which can be used, primarily with typewriters. These trays are arranged to hold a sheet of material which is to be copied in relation to a typewriter. However, the material which is to be copied does not coact in any manner with the keyboard of the typewriter.

U.S. Pat. No. 1,527,100 to Williams discloses a teaching device which can be used in connection with a typewriter and includes a layout of the typewriter keyboard. This device is used for training one to use a typewriter. However, the device in the Williams Patent essentially constitutes nothing more than a book having a layout of the standard typewriter keyboard. This layout does not coact in any manner with the keyboard itself.

U.S. Pat. No. 2,802,284 to Dreisonstok et al. discloses a device for projecting an image from a sheet of material onto a screen. The device is arranged in relationship to a typewriter keyboard in order to visually demonstrate the finger movements involved in the operation of a keyboard. However, and here again, the display on the screen does not coact in any manner with the actual keyboard of the typewriter.

Many companies also produce operating instruction booklets which contain tabs or other indexing systems for locating particular information about the operation or maintenance of the equipment. As a simple example, most purchasers of photocopiers are provided with an instruction and maintenance manual. When a particular symbol is displayed on a control panel of the copier or other equipment, the user examines the manual for that particular symbol and determines how to repair or otherwise maintain the equipment. Moreover, these manuals may also contain illustrations about the particular way in which the equipment may be repaired or maintained. However, the manuals do not coact with the equipment as such, but merely provide illustrations and written material as to the operation or maintenance thereof.

OBJECTS OF THE INVENTION

It is, therefore, one of the primary objects of the present invention to provide a computer keyboard template system in which a number of keyboard templates may be stored within a tray and which tray is adapted for disposition with respect to a computer keyboard.

It is another object of the present invention to provide a computer keyboard template system of the type stated in which any of a number of templates in a tray may be arranged such that the selected template is readily visible for use of a particular program in order to enable convenient and easy operation of the keyboard keys in order to access functions of that program.

It is a further object of the present invention to provide a computer keyboard template system of the type stated in which a template in a tray of templates can be located adjacent to a row of keys, such as a row of function keys on a computer keyboard in order to enable a quick and easy use of the computer keyboard function keys and thereby access various functions of a particular program.

It is also an object of the present invention to provide a computer keyboard template system of the type stated in which a large number of templates may be provided in a tray with an indexing system such that each of the templates may be selected for the operation of a particular program.

It is still another object of the present invention to provide a computer keyboard layout which utilizes a template arrangement having a tray with templates therein on the computer keyboard.

It is still another salient object of the present invention to provide a method of aiding in the use of a computer keyboard for operating any of a selected number of computer programs accessible in that computer.

With the above and other objects in view, our invention resides in the novel features of form, construction, arrangement and combination of parts presently described and pointed out in the claims.

BRIEF SUMMARY OF THE INVENTION

A computer keyboard template system for facilitating the use of a computer keyboard for any of a number of selected software programs. The template system comprises a tray which is sized and shaped for location in adjacent relationship to an edge of a row of keys on a computer keyboard. The tray is provided with means to receive a plurality of templates with each of the templates representing a different software program or a portion of a program. Moreover, each template can be located adjacent to an edge of keys in order to allow an operator to quickly and easily select the proper key for a desired operation in accordance with an instruction on the template.

The templates are provided on a flat surface thereof with outlined portions of certain of the keys on the keyboard. The outlined portions of the keys correspond in location to certain of the respective keys on the keyboard such that the user of the template may quickly and easily select a proper key for selected operation.

The templates are provided with an indexing means so that a user of the system may select the proper template and place that template in a position in the tray such that the instructions on the template along with a particular keyboard arrangement on the template are visibly apparent to a user.

The tray of the present invention is preferably constructed so that it is adjustably positionable with respect to the keyboard to facilitate viewing by a user. More preferably, the adjustment means comprises a means to change the angular position of the selected template with respect to the keyboard. Thus, the tray is uniquely designed to be used by a large number of users and can be adjusted to accommodate the particular viewing angle of an individual user.

In a more preferred embodiment, the tray is adapted to be located adjacent an upper row of the keys on the keyboard and a selected template is adjacent to the upper row of the keys. The upper row of the keys is usually selected for positioning of the template inasmuch as this upper row usually constitutes the function keys on most computer keyboards. Thus, the particular template will be located immediately adjacent to the function keys thereby enabling a user to determine which function keys are to be actuated in order to perform a particular function with any of the selected number of programs.

In one embodiment of the invention, the templates are each individual cards which are unconnected to one another. Thus, the templates are freely movable with respect to one another so that a selected card may be pulled from the stack and arranged on the front or uppermost position on the stack. In an another embodiment, the templates are each individual cards which are hingedly connected to one another. These cards in one embodiment may be hingedly connected on the side margins and in another embodiment they may be hingedly connected to one another at the upper and lower margins thereof.

This invention may possess other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention, but it is to be understood that such detailed description, as hereinafter set forth, is not to be taken in a limiting sense.

BRIEF DESCRIPTION OF THE DRAWINGS

Having thus described the invention in general terms, reference will now be made to the accompanying drawings (seven sheets in which:

FIG. 12 is a composite of FIGS. 12A and 12B in which:

DETAILED DESCRIPTION OF PREFERRED EMBODIMENTS

Referring now in more detail and by reference characters to the drawings which illustrate several practical embodiments of the present invention, A designates a computer keyboard template system located with respect to a computer keyboard 20, the latter of which is of a conventional construction. In this case, the computer keyboard 20 includes a base housing 22 and a relatively flat keyboard surface 24 thereon. Projecting from or mounted on the keyboard surface 24 are plurality of computer keyboard keys 26. An upper row 28 of the these computer keyboard keys may operate as function keys. In this case, the function keys are not designed for the introduction of information, as such, but rather only to perform a particular function in accordance with the computer program.

The computer keyboard template system preferably comprises a tray assembly 29 which includes a tray 30 hingedly mounted on a base plate 32. In this case, the base plate 32 is provided with a relatively flat undersurface for positioning on the surface 24 of the computer keyboard. Moreover, any convenient means may be provided for securing the adjustable tray assembly 29 onto the surface 24 of the keyboard. In one embodiment, adhesive strips 34 may be provided.

These adhesive strips 34 are preferably provided with a releasable backing which can be removed to thereby enable the adhesive strips 34 to adhesively secure the base plate 32 to the surface 24 of the computer keyboard input terminal.

Figure 1:
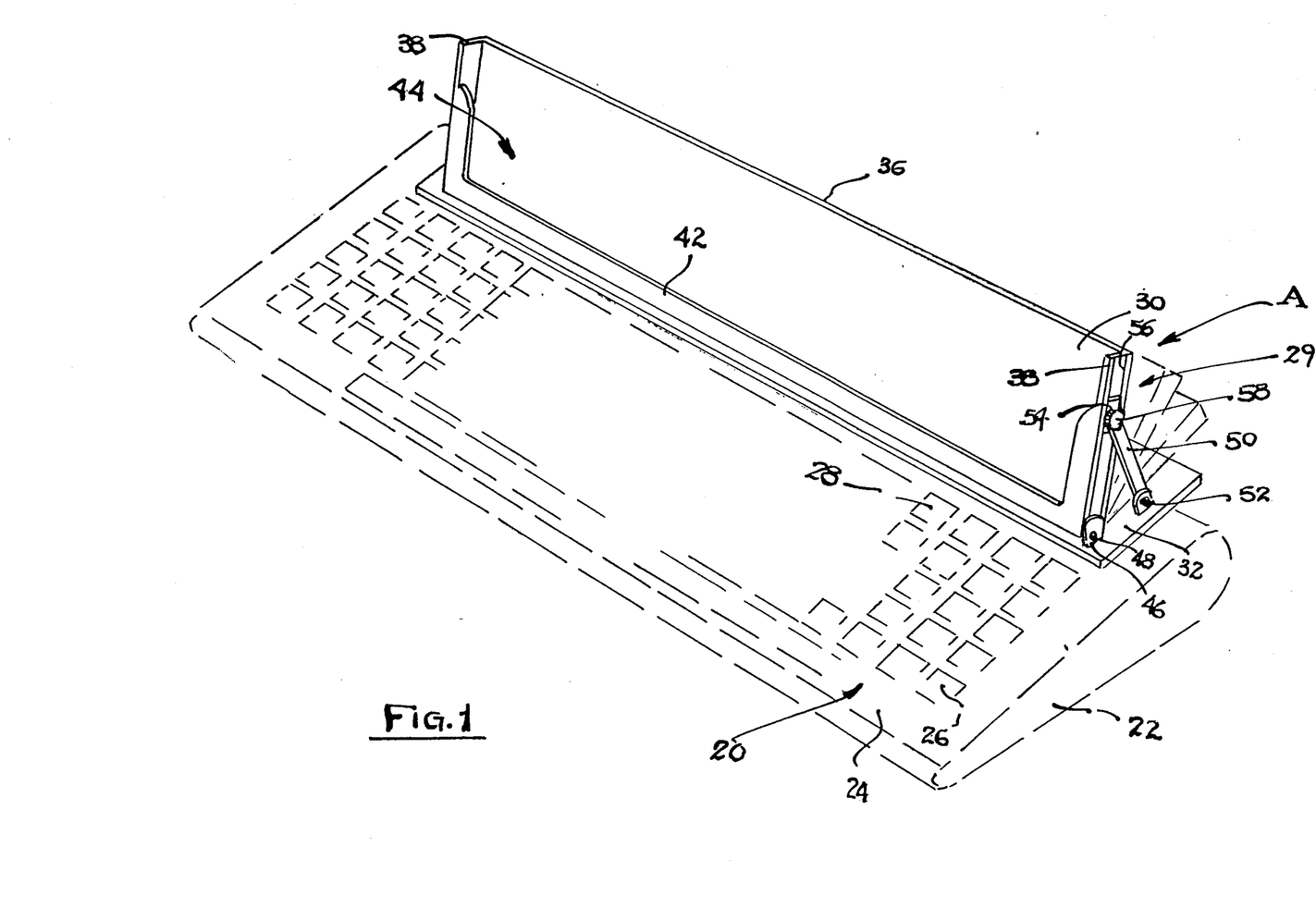
FIG. 1 is a perspective view of one form of computer keyboard template system constructed in accordance with and embodying the present invention.
Figure 2:
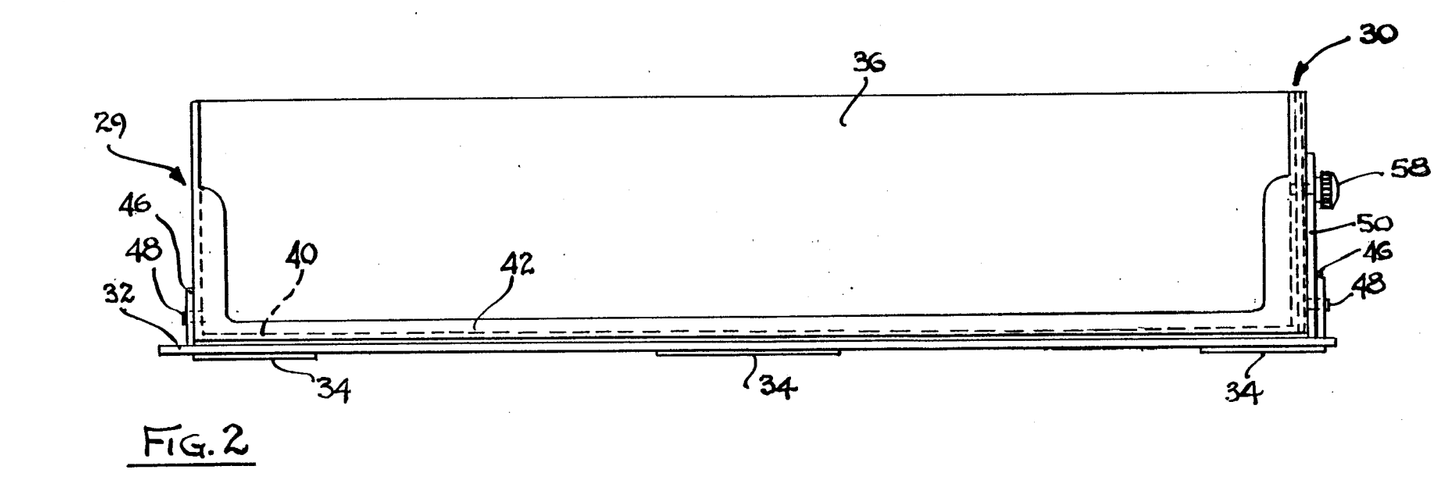
FIG. 2 is a front elevational view of the computer keyboard template system of FIG. 1.
Figure 3:
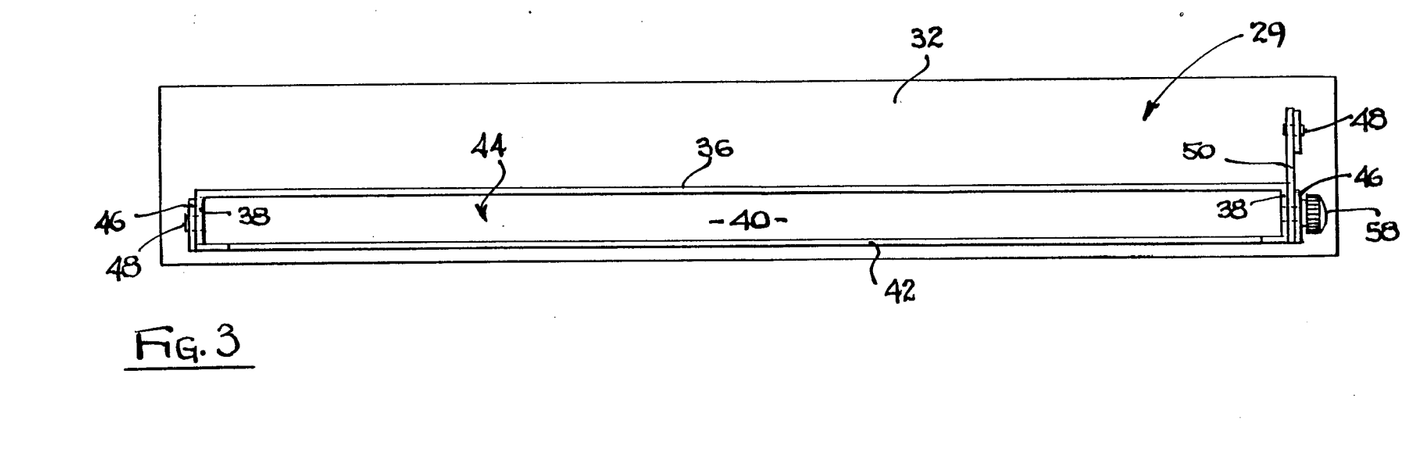
FIG. 3 is a top plan view of the computer keyboard template system of the present invention.
Figure 4:
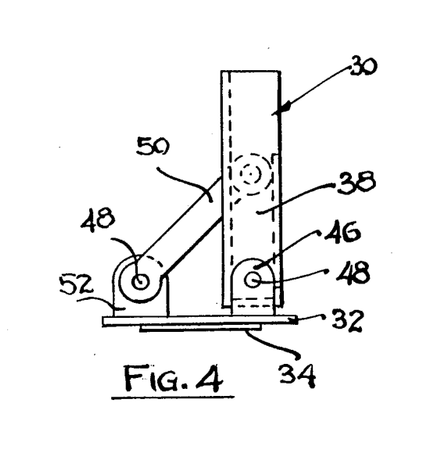
FIG. 4 is an end (left-hand end) elevational view of the computer keyboard template system of the present invention.
Figure 5:
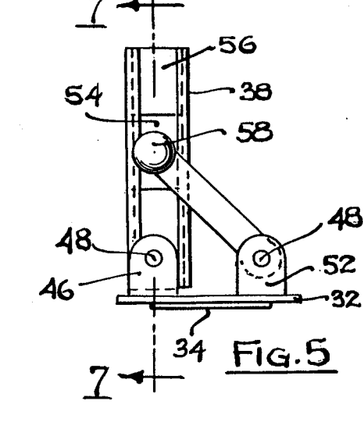
FIG. 5 is an opposite end (right-hand end) elevational view of the computer keyboard template system.
Figure 6:
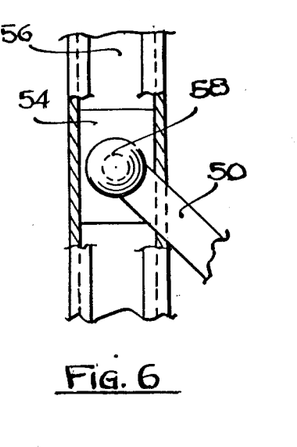
FIG. 6 is a somewhat enlarged fragmentary end elevational view, partially broken away and in section, of the mechanism of FIG. 5.
Figure 7:
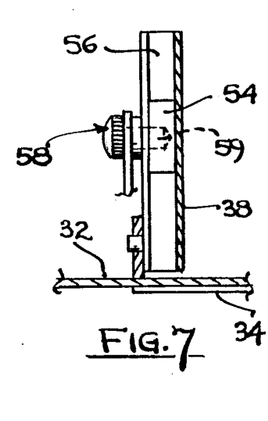
FIG. 7 is a vertical sectional view taken along line 7—7 of FIG. 5.

The adjustable tray 30 preferably comprises a backwall of 36 connected by forwardly projecting endwalls 38 and a bottom wall 40. Moreover, a front retaining edge or rim 42 is provided on the tray for defining a template receiving pocket 44, in the manner as best illustrated in FIGS. 1-3 of the drawings.

As indicated previously, the tray 30 is adjustably positionable with respect to the base plate 32. For this purpose, the tray is pivotably mounted on a pair of upstanding projections 46 which are secured to the base plate 32 and which receive pivot pins 48. Thus, and by further reference to FIGS. 1 and 4-7 of the drawings, it can be observed that the tray 30 can be moved to a selected angular position relative to the surface 24 of the computer keyboard. Several of these positions are shown in phantom lines in FIG. 1.

Any means for conveniently adjusting the position of the tray 30 with respect to the base plate 32 may be provided. In one of the preferred embodiments, this means for adjustably positioning of the tray 30 comprises a link 50 which is pivotably mounted on an upstanding tab 52 on the tray on the base plate 32. The upper end of the link 50 is provided with a slide 54 which is movable within a channel 56 formed in the end wall 38.

The slide 54 may be secured in a fixed position within the channel 56 by any suitable mechanism. One such mechanism is more fully illustrated in FIGS. 5-7 of the drawings and comprises a thumb screw 58 which also serves as a means for pivotally securing the upper end of the link 50 to the slide 54. The thumb screw 58 is provided with a pointed shank 59 which is capable of bearing against the end wall 38 when the thumb screw is tightened. In this way, the angular position of the tray 30 is fixed relative to the base plate 32. In like manner, when the thumb screw 58 is turned in the opposite direction, the pointed shank 59 is released from engagement with the end wall 38 and thus allows the slide 54 to be freely movable within the channel 56 thereby enabling a change of the position of the tray 30 with respect to the base plate 32.

Figures 8, 9, 10:
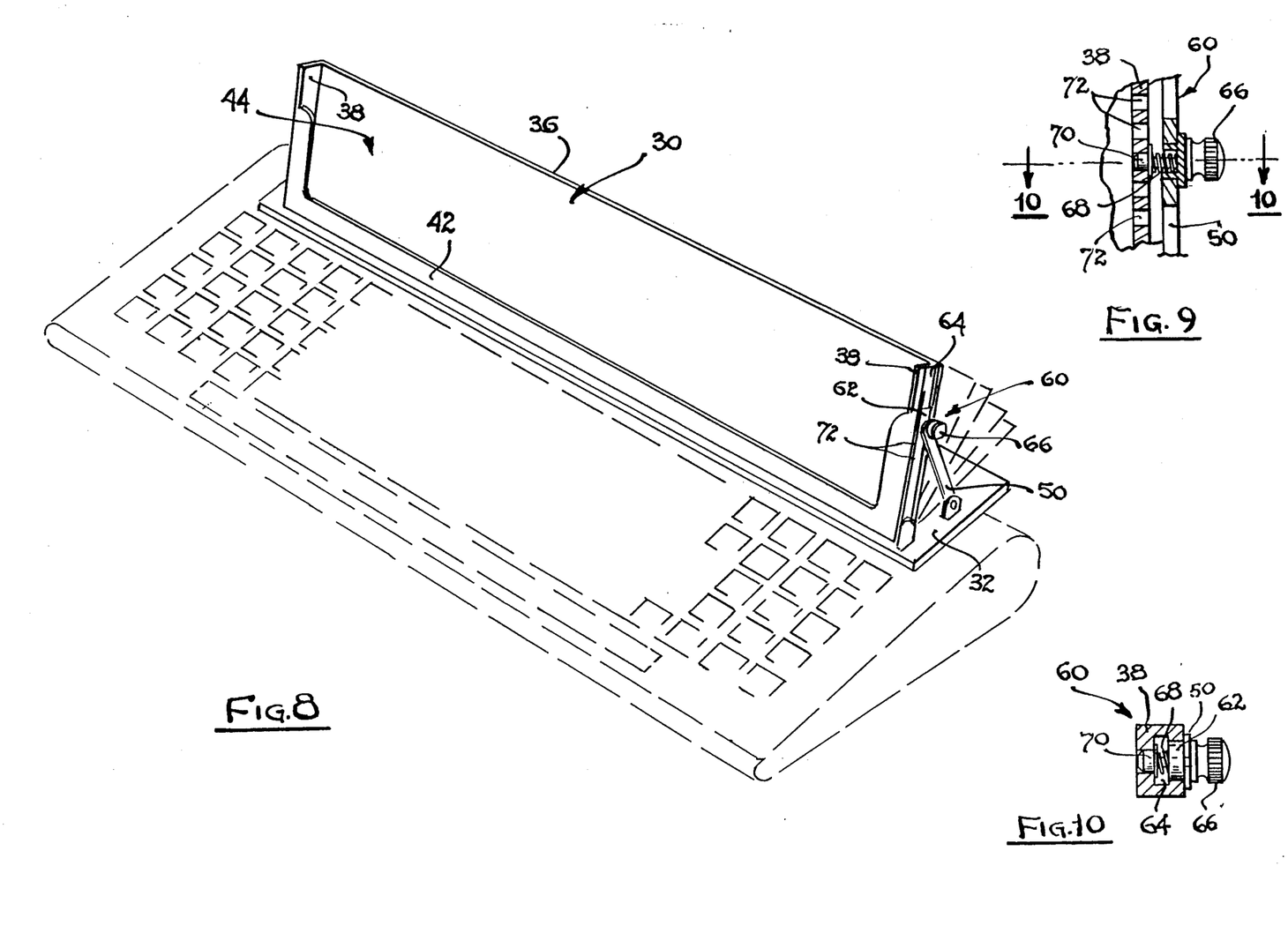
FIG. 8 is a perspective view showing a modified form of compute keyboard template system constructed in accordance with and embodying the present invention.
FIG. 9 is a fragmentary front plan view, partially in section, of a portion of the mechanism which allows the positioning, such as raising and lowering of the tray.
FIG. 10 is a horizontal sectional view taken along line 10—10 of FIG. 9 and showing the mechanism in the locked position.

FIGS. 8-10 of the drawings illustrate another embodiment of a computer keyboard template system constructed in accordance with and embodying the present convention. The computer keyboard template system of FIGS. 8-10 differs from that computer keyboard template system of A in the provision of a different mechanism for raising and lowering the angular position of the tray 30. In this case, a positioning mechanism 60 is provided. This positioning mechanism 60 utilizes a slide 62, similar to the previously described slide 54, and which is also moveable in a channel 64 formed by the end wall 38. The slide 62 is also pivotally connected to the link 50, in the manner as best illustrated in FIG. 8 of the drawings.

A releasable push-button pin 66 is provided for pivotally securing the upper end of the link 50 to the slide 62. The push-button pin 66 is spring operated and biased inwardly by means of a compression spring 68 disposed about the shank 70 of the drawings. When the pin 66 is pulled outwardly, the shank 70 will not engage any of a plurality of vertically aligned holes 72 in the end wall 38. However, as the pin 66 is released, it will move inwardly into one of the holes where it can be locked in a specific position.

In accordance with the above identified construction, it can be observed that the angular position of the tray 30 can be changed by withdrawing the pin 66 and removing the shank 70 of the pin 66 from any of the plurality of the aligned holes 72.

Figure 11:
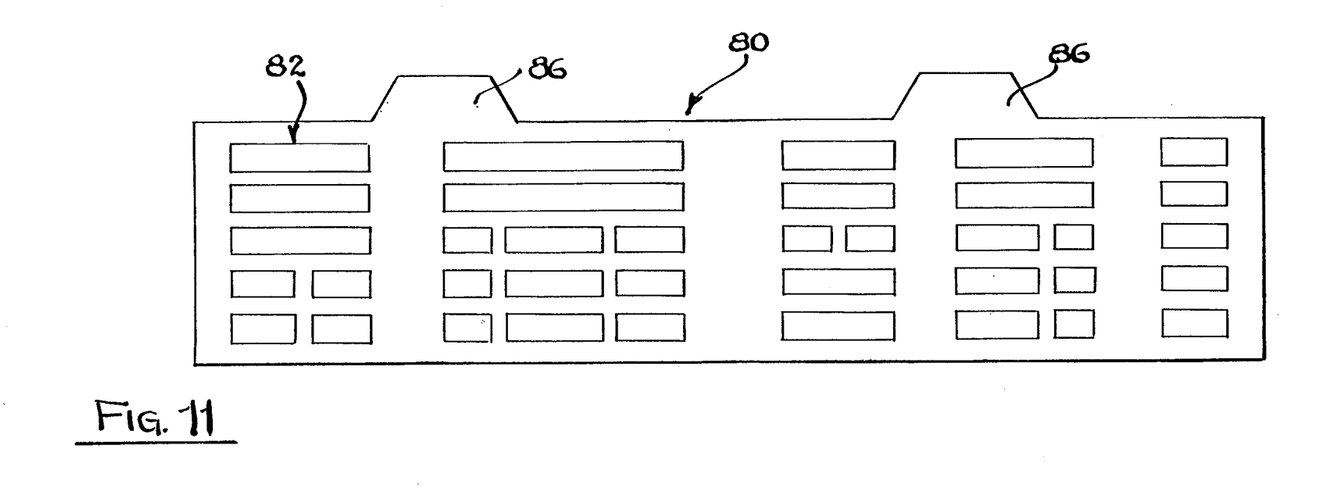
FIG. 11 is an elevational view of a computer keyboard template used with the template system of the present invention.

The pocket 44 is sized to receive a large number of templates 80, one of which is shown in FIG. 11 of the drawings. It can be observed that the templates 80 are designed to fit snugly, but nevertheless removably, within the pocket 44 of the tray 30. These templates 80 are each provided with a keyboard layout 82 on a flat surface thereof and this keyboard layout may literally include the outlines of certain of the keys 26 on the computer keyboard. In this way, the keyboard template may be located adjacent to the keyboard of the computer in order to enable the operator to quickly examine the layout on the template and thereby operate the proper function keys on the computer keyboard input terminal.

Each of these templates 80 are also provided with indexing tabs or so-called "location tabs" 86. These indexing tabs would be provided with nomenclature on the surfaces thereof, such that a user of the computer keyboard template system would be able to easily and quickly locate a particular template for use with a easily and quickly locate a particular template for use with a particular program which is to be accessed on the computer. Thus, for example, if the user of the computer keyboard template system desires to operate a particular word process package, he or she will immediately locate the computer keyboard template which provides the instructions for operation of that word process package by examining the index tabs 86.

The same would hold true for each of the other programs which may have been stored into the computer memory and for which there is a computer keyboard template. When the user locates the particular template of interest, he or she will immediately pull that template from the stack and arrange the template on the forward surface of the stack of templates within the tray 30.

Figure 12A:
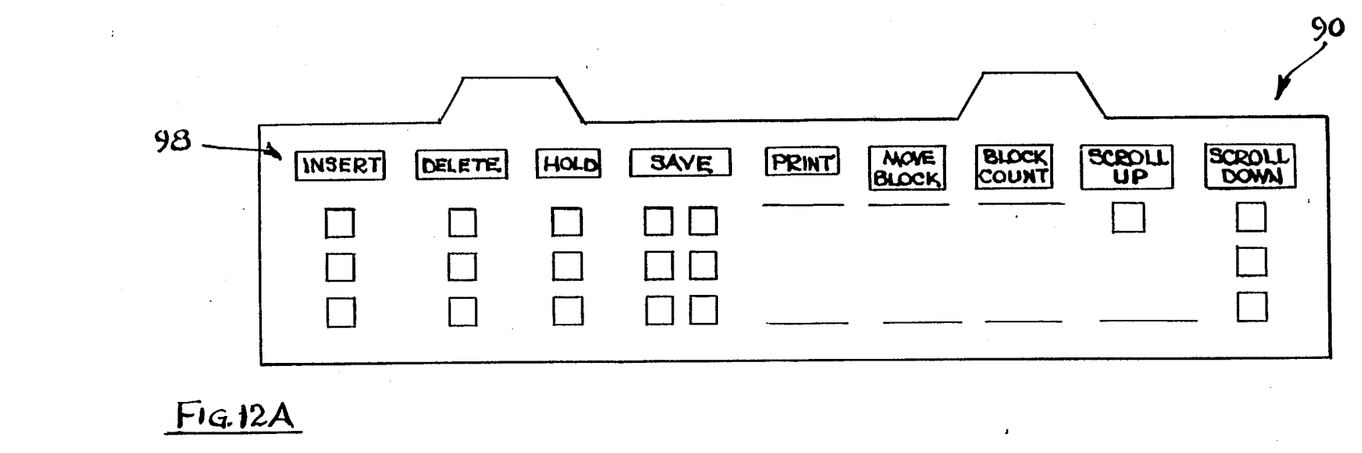
FIG. 12A is an elevational view of another type of keyboard template which may be used in accordance with the present invention.
Figure 12B:
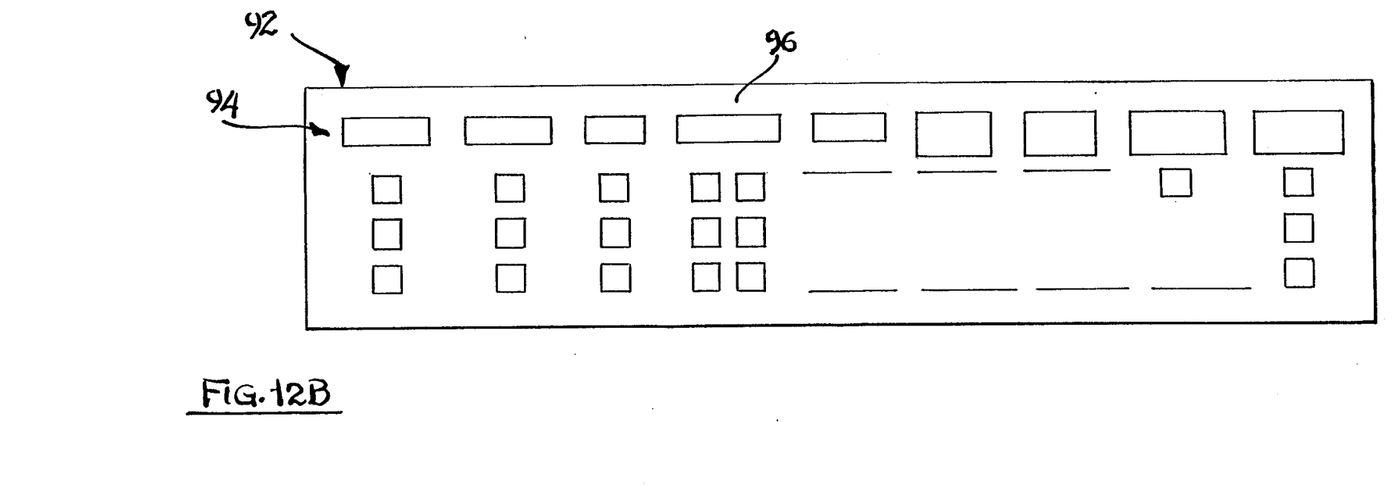
FIG. 12B is a top plan view of a computer keyboard layout with which the template of FIG. 12A may be used.

In accordance with the present invention, the template itself may have a computer keyboard layout similar to the layout of the keys on the computer keyboard, as aforesaid. FIGS. 12A and 12B illustrate a combination of a computer keyboard template 90 which co-acts with and is highly compatible for use with a computer keyboard 92 of FIG. 12B. In this case, it can be observed that the computer keyboard 92 is provided with an upper row 94 of function keys 96. Moreover, it can be observed that the function keys are located in a particular order and may have differing sizes, as shown. In like manner, the computer keyboard template 90 is provided with an upper row 98 showing a plurality of boxes conforming both in location and size and shape to the particular function keys 96. Each of the remaining portions of the illustrated keyblock on the template 90 of FIG. 12A correspond in location and size and shape to the remaining keys on the computer keyboard 92.

In accordance with the above identified construction, if the user of the system desires to perform a certain function with a selected program that user only has to examine the template in order to determine which of the function keys or other key combinations to actuate and the information will be readily provided on the surface of the template itself. In this way, it can be observed that the template itself literally coacts with the keyboard on the computer keyboard input terminal.

Figure 13:
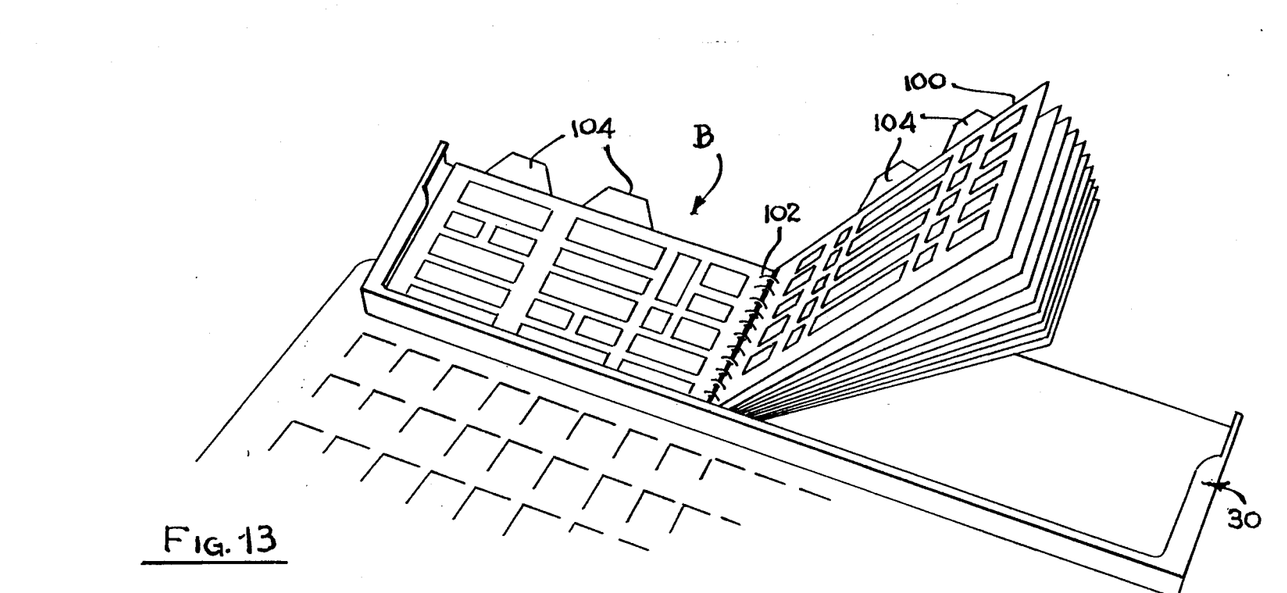
FIG. 13 is a perspective view of a modified form of computer keyboard template system constructed in accordance with and embodying the present invention.
Figure 14:
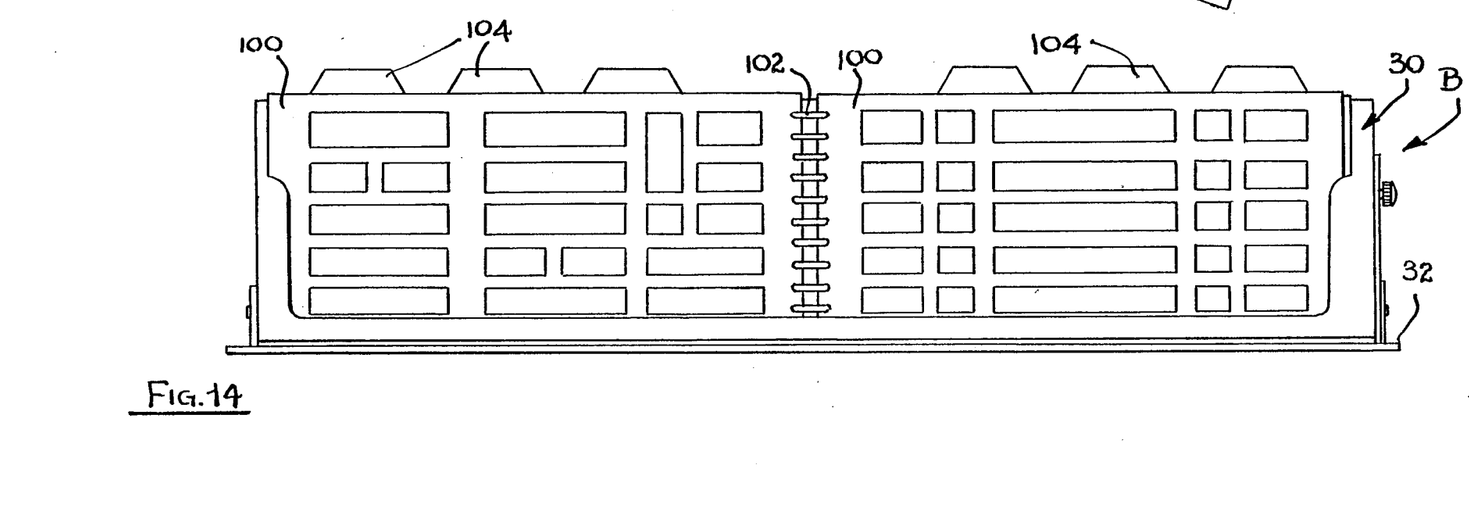
FIG. 14 is a front elevational view of the computer keyboard template system of FIG. 13.

FIGS. 13 and 14 illustrate a modified form of computer keyboard template system B which is also constructed in accordance with and embodies the present invention. The modified form of computer keyboard template system comprises a tray 30 on the base plate 32 as aforesaid. However, in this particular case, a plurality of templates 100 are arranged somewhat in a book-type format. Thus, a plurality of templates 100 have their side margins bound by a ring type binder 102. In this way, the book of templates can be stored within the tray 30, in the manner as shown in FIGS. 13 and 14. It is only necessary for the user to turn the template pages along the hinged ring binder 102 in order to find the proper template for use with the particular computer program. The template pages may be provided with indexing tabs 104 in order for the user to quickly locate the desired computer keyboard template. In this case, the tabs 104 are located on the upper margin of each of the individual pages. Each particular keyboard template 100 would be provided with a indexing tab 104 in order to enable location of that particular template for a specified program.

The computer keyboard template pages would be formed of the same material used in the computer keyboard template system A of the present invention. Moreover, in this arrangement, two individual facing pages would operate together to reference the computer keyboard. Thus, in the embodiment as illustrated in FIGS. 13-14 the left-hand page and right-hand page would operate jointly as one particular template for the keyboard input terminal and for a particular selected program which is to be accessed from the memory of that computer.

Figure 15:
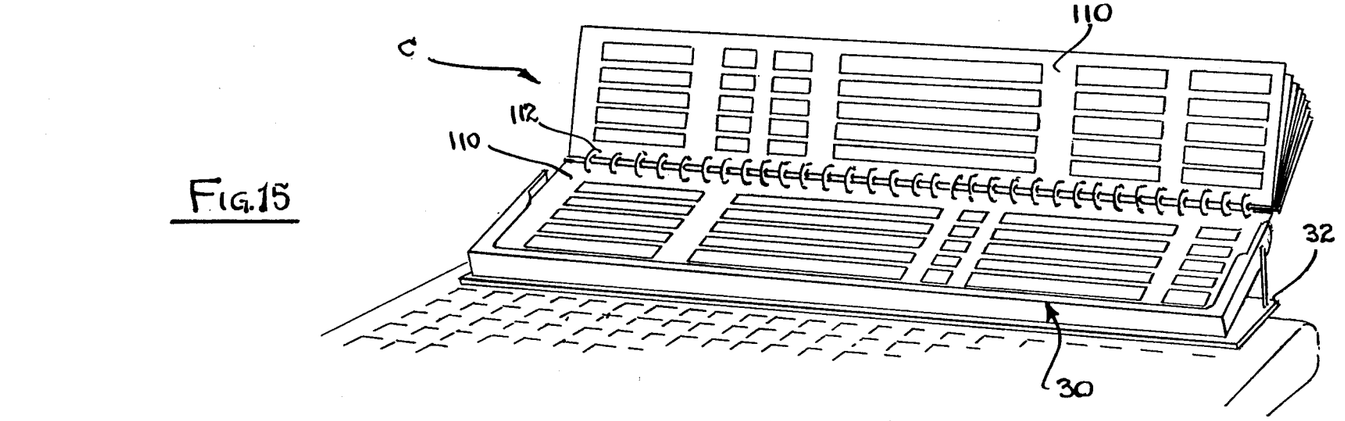
FIG. 15 is a perspective view of still another modified form of computer keyboard template system constructed in accordance with and embodying the present invention.
Figure 16:
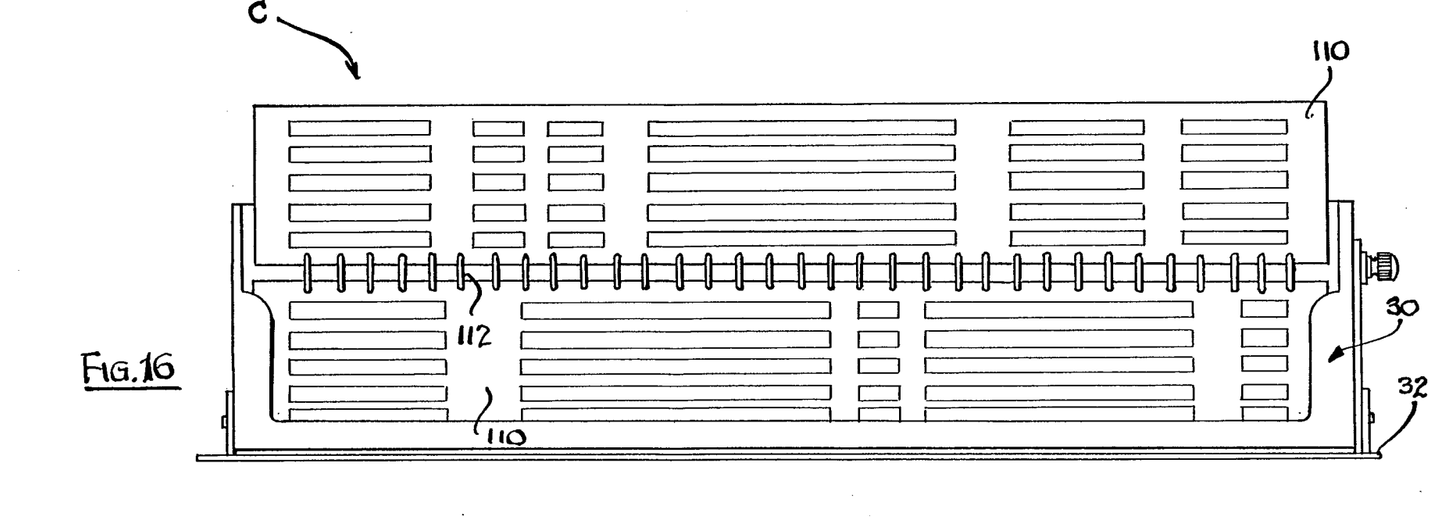
FIG. 16 is front elevational view of a portion of the computer keyboard template system of FIG. 15.

FIGS. 15 and 16 illustrate another modified form of compute keyboard template system C which utilizes a plurality of templates or so-called template cards 110 and which are hingedly mounted to one another on their upper and lower margins, in the manner as illustrated. The computer keyboard templates 110 would also be located within a tray 30 located on a base plate 32 much in the same manner as the previously described embodiments of the present invention. A ring binder 112 would be used for securing the upper and lower margins of the individual templates 110 so that they may be turned, in the manner as best illustrated in FIG. 15. Thus, and in this respect, the computer keyboard template system C is similar to the computer keyboard template system B of FIGS. 13 and 14 except that the individual template cards are rotated in a different direction. Each of the individual templates may be turned on the hinged ring binder 102 so that a selected and desired template may be located on the surface of the tray in juxtaposition to the function keys of the computer keyboard.

The computer keyboard templates are preferably formed of card stock such as cardboard stock and are oftentimes referred to as "cards". However, it should be understood that these templates could be formed of any materials normally employed in the production of templates. The various keyboard templates could be secured in a type of notebook binder such as shown in FIGS. 13-16. The tray itself or otherwise, the base plate or both could be provided with a dished portion or trough in order to accommodate pencils and like writing implements.

In accordance with the above outlined construction, it can be observed that the computer keyboard template systems of this invention completely eliminate the problem of storing templates not currently in use. All such templates may be stored in the same tray. Moreover, because the same tray can be fitted to virtually any keyboard design only one tray is required for essentially all computer keyboards. It is only necessary to insert the cards or templates within the tray. Thus, many programs and keyboard templates can be used with any particular computer system.

Due to the fact that the tray is pivotable along the base plate, not only can the viewing angle be changed to accommodate a particular operator requirement, but the pivotal access to the tray also provides easier access to the cards in cramped environments. For this purpose, and as indicated above, the templates are provided with index tabs. These tabs not only provide identification information with regard to the particular template, but also provide a means for grasping and pulling the template out of the stack of templates.

The present invention thereby obviates numerous problems which have arisen in the prior art, as mentioned above. For example, even though there are numerous computer models, with different computer keyboard designs in the market place and even though the manufacturer of a certain brand of computers may manufacturer different models with different keyboard designs, the template system of the present invention obviates all the problems previously encountered. With the simple and singular system as provided herein any number of templates may be used with any particular computer keyboard. Moreover, since the templates are stored in a relatively secure environment, they are not readily lost which has been a frequent problem for computer users having a large number of programs and the associated templates. Moreover, they are stored in a location where they are not readily damaged when not in use. In addition, it is not necessary for the operator to store the computer template in another location not necessarily in proximity to the computer when they are not in use.

Thus, there has been illustrated and described a unique and novel computer keyboard template system in which a selected computer keyboard template can be arranged in a juxtaposed relation to the keyboard of a computer and which may coact the keyboard of the computer. Thus, the present invention fulfills all of the objects and advantages which have been sought therefor. It should be understood that many changes, modifications, variations and other uses and applications will become apparent to those skilled in the art after considering the specification and the accompanying drawings. Therefor, any and all such changes, modifications, variations and other uses and applications which do not depart from the spirit and scope of the invention are deemed to be covered by the invention.

Having thus described our invention, what we desire to claim and secure by letters patent is:

1. A computer keyboard template system for facilitating use of a computer keyboard in which one or more particular selected software programs may be used therewith, said template system comprising:
    (a) a tray sized and shaped for location adjacent to an edge of a row of keys on the computer keyboard,
    (b) means on said tray forming a template receiving pocket to removably receive a plurality of templates with each of the templates representing a different software programs on a portion thereof, said templates having a size and shape such that they can be located in said template receiving pocket and adjacent to the edge of a row of keys to enable an operator to quickly and easily select a keyboard key for a selected operation in accordance with an instruction on the template, and
    (c) indexing means forming part of said templates to enable certain of the templates to remain in the tray with a selected one of the templates being arranged so that the instructions thereof are visibly present to a user.

2. The computer keyboard template system of claim 1 further characterized in that said tray is adjustably positionable on said keyboard to facilitate viewing by a user.

3. The computer keyboard template system of claim 2 further characterized in that the adjusting means comprises means to change the angular position of the selected template with respect to the keyboard.

4. The computer keyboard template system of claim 1 further characterized in that the tray is sized and shaped to be located adjacent an upper row of keys on said keyboard and said selected template has a lower edge adjacent said upper row of keys.

5. The computer keyboard template system of claim 1 further characterized in that said templates are each individual cards which are unconnected to one another and freely movable with respect to one another so that a selected card may be pulled from a stack thereof and arranged at the front of the stack.

6. The computer keyboard template system of claim 1 further characterized in that said templates are each individual cards which are hingedly connected to one another.

7. The computer keyboard template system of claim 6 further characterized in that said templates are hingedly connected to one another at side margins thereof.

8. The computer keyboard template system of claim 6 further characterized in that said templates are hingedly connected to one another at upper or lower margins thereof.

9. A computer keyboard template system for facilitating use of a computer keyboard for a particular software program said template system comprising:
(a) a tray sized and shaped for location adjacent to an edge of a row of keys on the computer keyboard,
(b) means on said tray forming a template receiving pocket to receive a plurality of templates,
(c) a plurality of templates for use with said system and being sized and shaped to be received in the pocket, each of the templates representing a different software program or a portion thereof and which template can be located with respect to said keyboard, each of said templates having a flat surface thereof outline portions of certain of the keys on the keyboard and the outline portions of the keys corresponding in location to respective keys on the keyboard such that a user of the template system may quickly and easily select a program key for a selected operation in accordance with an instruction on the template, and
(d) indexing means forming part of said templates to enable certain of the templates to remain in the tray with a selected one of the templates being arranged so that the instructions thereof are visibly present to the user of the template system.

10. The computer keyboard template system of claim 9 further characterized in that instructions for use of keys on the computer keyboard are included in the outline portion of the keys.

11. The computer keyboard template system of claim 10 further characterized in that certain of the outline portions have a size and shape different than certain of the other outline portions.

12. The computer keyboard template system of claim 11 further characterized in that the outline portions of keys are printed on a flat surface of the templates.

13. The computer keyboard template system of claim 9 further characterized in that said tray and a template therein is located adjacent an edge of a row of keys.

14. The computer keyboard template system of claim 13 further characterized in that said tray comprises adjusting means so that the tray is adjustably positionable on said keyboard to facilitate viewing by a user.

15. The computer keyboard template system of claim 14 further characterized in that the adjusting means comprises means to change the angular position of the selected template with respect to the keyboard.

16. The computer keyboard template system of claim 9 further characterized in that the tray is sized and shaped to be located adjacent an upper row of keys on said keyboard and said selected template is adjacent to said upper row of keys.

17. The computer keyboard template system of claim 9 further characterized in that said templates are each individual cards which are unconnected to one another and freely movable with respect to one another so that a selected card may be pulled from stack thereof and arranged at the front of the stack.

18. A computer keyboard layout which enables an operator to easily and quickly select a key on the keyboard of a computer for operation in accordance with a particular one program of several programs stored in the computer, said computer keyboard layout comprising:
(a) a computer keyboard input terminal having a surface thereon and a plurality of manually actuable keyboard keys on said terminal surface,
(b) a tray sized and shaped for location with respect to and located on said terminal surface adjacent to an edge of a row of keys on the computer keyboard input terminal,
(c) means on said tray forming a template receiving pocket for receiving a plurality of templates in said tray,
(d) a plurality of templates for use with a computer keyboard and being sized and shaped to be received in the pocket, each of the templates representing a different software program or a portion thereof and with a selected template located adjacent to the edge of a row of keys to enable an operator of the keyboard input terminal to quickly and easily select a program key for a selected operation in accordance with an instruction on the template, and
(e) indexing means forming part of said templates to enable certain of the templates to remain in the tray with a selected one of the templates being arranged so that the instructions thereof are visibly present to the operator of the keyboard input terminal.

19. The computer keyboard layout of claim 18 further characterized in that the tray is located adjacent an upper row of keys.

20. The computer keyboard layout of claim 18 further characterized in that adjusting means is provided on said tray for adjustably positioning said tray on said keyboard terminal surface to facilitate viewing by a user.

21. The computer keyboard layout of claim 20 further characterized in that the adjusting means comprises means to change the angular position of the selected template with respect to the keyboard.

22. The computer keyboard layout of claim 18 further characterized in that each of said templates have on a flat surface thereof with outline portions of certain of the keys on the keyboard terminal surface and the outline portions of the keys correspond in location to respective keys on the keyboard 23. A method of aiding in the use of a computer keyboard with any of a selected number of computer programs accessible in a computer connected to the keyboard, said method comprising:
(a) positioning a template receiving tray adjacent to an edge of a keyboard of a computer,
(b) locating a particular template normally stored in a pocket in said tray in a position where the particular template is uppermost of the templates stored in the tray and in a position where a substantial portion of a flat surface of the template is readily viewable to a user, said particular template being located in a position in said pocket adjacent to a row of keys on the computer keyboard, and (c) examining said template to obtain an instruction for operating the keys on the keyboard in accordance with a particular program which has been accessed.

24. The method of claim 23 further characterized in that each of said templates has on a flat surface thereof an outline portion of keys on the keyboard and the outline portions of the keys correspond in location to certain of the respective keys on the keyboard.

* * * * *